United States Patent
Ngeow et al.

(10) Patent No.: US 9,637,610 B2
(45) Date of Patent: May 2, 2017

(54) SILICA-FILLED ENR MASTERBATCH AND CROSS LINKABLE ELASTOMERIC COMPOSITION

(71) Applicant: LEMBAGA GETAH MALAYSIA, Kuala Lumpur (MY)

(72) Inventors: Yen Wan Ngeow, Selangor (MY); Shamheza binti Suhatta, Selangor (MY); Nurul Hayati binti Yusof, Kuala Lumpur (MY); Fauzi bin Mohd Som, Selangor (MY)

(73) Assignee: Lembaga Getah Malaysia, Kuala Lumpur (MY)

( * ) Notice: Subject to any disclaimer, the term of this patent is extended or adjusted under 35 U.S.C. 154(b) by 0 days.

(21) Appl. No.: 14/782,582

(22) PCT Filed: Sep. 6, 2013

(86) PCT No.: PCT/MY2013/000160
§ 371 (c)(1),
(2) Date: Oct. 5, 2015

(87) PCT Pub. No.: WO2014/163478
PCT Pub. Date: Oct. 9, 2014

(65) Prior Publication Data
US 2016/0289423 A1    Oct. 6, 2016

(30) Foreign Application Priority Data
Apr. 5, 2013  (MY) ............................ 2013001238

(51) Int. Cl.
| | |
|---|---|
| *C08K 5/3437* | (2006.01) |
| *C08K 5/18* | (2006.01) |
| *C08K 3/36* | (2006.01) |
| *C08K 3/22* | (2006.01) |
| *C08K 13/02* | (2006.01) |
| *C08K 5/098* | (2006.01) |
| *C08K 5/09* | (2006.01) |
| *C08K 5/01* | (2006.01) |
| *C08K 3/04* | (2006.01) |
| *C08L 7/00* | (2006.01) |
| *B60C 1/00* | (2006.01) |
| *C08L 9/06* | (2006.01) |
| *B60C 7/00* | (2006.01) |

(52) U.S. Cl.
CPC .......... *C08K 5/3437* (2013.01); *B60C 1/0016* (2013.04); *C08K 3/04* (2013.01); *C08K 3/22* (2013.01); *C08K 3/36* (2013.01); *C08K 5/01* (2013.01); *C08K 5/09* (2013.01); *C08K 5/098* (2013.01); *C08K 5/18* (2013.01); *C08K 13/02* (2013.01); *C08L 7/00* (2013.01); *C08L 9/06* (2013.01); *B60C 7/00* (2013.01); *C08K 2003/2296* (2013.01); *C08K 2201/006* (2013.01)

(58) Field of Classification Search
CPC .......... B60C 1/00; B60C 1/0016; B60C 7/00; C08K 13/02; C08K 3/04; C08K 3/22; C08K 3/34; C08K 3/36; C08K 5/01; C08K 5/09; C08K 5/098; C08K 5/18; C08K 5/3437; C08K 2003/2296; C08K 2201/006; C08L 15/00; C08L 7/00
USPC ........................................................... 524/87
See application file for complete search history.

(56) References Cited

U.S. PATENT DOCUMENTS

2005/0209390 A1*  9/2005  Yagi ..................... B60C 1/0016
                                                524/493
2007/0232745 A1* 10/2007  Sakaki .................... C08C 1/14
                                                524/492
2010/0130663 A1   5/2010  Taguchi et al.

OTHER PUBLICATIONS

PCT International Search Report and Written Opinion of the International Searching Authority for PCT/MY2013/000160, dated Nov. 8, 2013, 5 pages.
Yusof et al. "Preparation of Silica-ENR Masterbatch via Latex Stage", Journal of Rubber Research 14.4 (2011): pp. 185-199. Print.

* cited by examiner

*Primary Examiner* — Ling Choi
*Assistant Examiner* — Chun-Cheng Wang
(74) *Attorney, Agent, or Firm* — Workman Nydegger

(57) ABSTRACT

A cross linkable elastomeric composition comprising silica-epoxidized natural rubber (ENR) elastomer as masterbatch, to produce crosslinkable rubber products used in industrial applications preferably the outer layer of solid tire that is capable of providing low rolling resistance and good wet grip properties, the silica-filled ENR masterbatch is a ready compounded masterbatch which is prepared via latex stage preparation which comprises antioxidant, oil emulsion, silica dispersion and ENR latex.

17 Claims, No Drawings

SILICA-FILLED ENR MASTERBATCH AND CROSS LINKABLE ELASTOMERIC COMPOSITION

FIELD OF THE INVENTION

The present invention relates to a cross linkable elastomeric composition and processes of preparing the same.

BACKGROUND OF THE INVENTION

Conventional solid tyre on the market today generally is used at industrial area that require the solid tyre to have puncture resistance, able to undertake relatively high loads, and having good abrasion and cut resistance properties. These solid tyres are generally manufactured using synthetic rubber where the source of materials is depleting or partially blended with natural rubber to achieve the require properties.

The tyre provides satisfactory performance when the tyre is operated on even surfaces such as concrete ground in a well maintained factory. However, the tyre might not perform effectively when it is used on deteriorated, uneven road or wet surface such as quarries, mines and mills. If the tyre handling is not performing effectively, it may cause injury to vehicle occupant or people around the vehicle. The foregoing describes the prior known limitations encountered by conventional solid tyres and their users.

A co-pending Malaysian Patent Application No. PI 2011004684 describes a method for preparing silica-filled epoxide natural rubber (ENR) masterbatch in latex comprising (i) 100 parts by weight of elastomer containing ENR 25 latex with 25% mole of epoxidation; with (ii) oil emulsion either aromatic or paraffinic or naphthenic oil in the form of 50% with 2 to 3 parts to the latex; with (iii) antioxidant in the form of a 30% dispersion with 2 to 3 parts to the latex; with (iv) silica in the form of a 10% to 50% dispersion with 10 to 70 parts to the latex; and (v) methods of coagulating silica-ENR mixtures either via (a) stirring only, (b) stirring with heat, or (c) stirring with acid to produce ready compounded silica-filled ENR masterbatch that is mainly directed to alleviate the problem of agglomeration of silica formed in rubber from prior known dry rubber processing methods.

However, there still exists a major hurdle in the existing and known rubber masterbatches whereby it is very difficult to attain both good traction/wet grip properties and low rolling resistance at the same time in a tyre tread composition.

Hence as apparent from the above said, it is imperative to provide for suitable rubber masterbatch preparations and the crosslinkable elastomeric compositions comprising the same, capable of being used in the production of crosslinked rubber products suitable for industrial applications, particularly in the production of solid tyres and specifically for solid tyre outer layers that would overcome the existing prior art problem of attaining both good traction/wet grip properties and low rolling resistance in the same tyre tread composition.

Moreover, there is a strong need in the art to provide for such suitable rubber masterbatch preparations and crosslinkable elastomeric compositions comprising the same as tyre tread compositions which provides both good wet traction and low rolling resistance performance of crosslinked rubber products especially solid tyres, specifically solid tyre outer layers, and also favour improved performance in terms of both better tyre handling and less fuel consumption of the automobiles using such tyres additionally imparting the desired comfort index to the vehicle occupants.

SUMMARY OF THE INVENTION

In the present invention there is provided a silica-filled epoxide natural rubber (ENR) masterbatch as a ready compounded masterbatch obtained from latex stage preparation comprising antioxidant, oil emulsion, silica dispersion and ENR latex in a form which is adapted to favour producing crosslinkable rubber products with both good wet traction/wet grip index in the range of 170-180 and low rolling resistance index in the range of 90-98 for superior performance based crosslinkable rubber products.

The present invention relates to a silica-filled epoxide natural rubber (ENR) masterbatch wherein said silica-filled epoxide natural rubber (ENR) elastomer as a ready compounded masterbatch comprises a range of 80 to 120 parts by weight of epoxidised natural rubber with a range of 5 to 70% mole of epoxidation and 5 to 80 parts by weight of silica.

Preferably in said silica-filled ENR masterbatch said silica filled-epoxide natural rubber (ENR) elastomer as a ready compounded masterbatch comprise 100 parts by weight of epoxidised natural rubber with 25% mole of epoxidation and 5 to 80 parts by weight of silica.

The present invention also provides the said crosslinkable elastomeric composition which comprises of (i) 100 parts by weight of epoxidised natural rubber with 25% mole of epoxidation; (ii) 5 to 80 parts weight of silica; (iii) 5 to 80 parts by weight of carbon black having a nitrogen specific surface area of 30 to 200 ml/100 g and dibutyl phthalate (DBP) of 30 to 150 ml/100 g; (iv) 5 to 10 parts of process oil either naphthenic, aromatic or paraffinic oil; (v) 1 to 3 parts of N-(1,3-dimethylbutyl)-N'-phenyl-p-phenylendiamine; (vi) 1 to 3 parts of 2,2,4-Trimethyl-1,2-dihydroquinoline; and (vii) 1.5 to 2.5 parts of vulcanisation accelerator, suitable for further dry rubber compounding processes.

DETAILED DESCRIPTION OF THE INVENTION

The features of the present invention are explained hereunder in greater detail in relation to the following non-limiting examples and accompanying figures. Hereinafter, this specification will describe the present invention according to the preferred embodiments of the present invention. However, the following example is to be understood that limiting the description to the preferred embodiments of the invention is merely to facilitate discussion of the present invention and it is envisioned that those skilled in the art may devise various modifications and equivalents without departing from the scope of the appended claims.

The present invention provides a silica-filled epoxide natural rubber (ENR) masterbatch as a ready compounded masterbatch obtained from latex stage preparation comprising antioxidant, oil emulsion, silica dispersion and ENR latex from sustainable resources which is adapted to favour producing crosslinkable rubber products with both good wet traction/wet grip index in the range of 170-180 and low rolling resistance index in the range of 90-98 for superior performance based crosslinkable rubber products.

The present invention relates to a silica-filled epoxide natural rubber (ENR) masterbatch wherein said silica-filled epoxide natural rubber (ENR) elastomer as a ready compounded masterbatch comprising a range of 80 to 120 parts by weight of epoxidised natural rubber with a range of 5 to 70% mole of epoxidation and 5 to 80 parts by weight of silica.

In a preferred embodiment said silica filled-ENR masterbatch comprises 100 parts by weight of epoxidised natural rubber with 25% mole of epoxidation and 5 to 80 parts by weight of silica.

In another embodiment, a crosslinkable elastomeric composition comprising (i) a silica-filled ENR masterbatch as a ready compounded masterbatch obtained from latex stage preparation which comprises antioxidant, oil emulsion, silica dispersion and ENR latex with or without (ii) conventional additives for use in crosslinkable rubber products that favours both good wet traction/wet grip index in the range of 170-180 and low rolling resistance index in the range of 90-98 for superior performance of said crosslinkable rubber products.

It is thus a finding of the present invention, whereby it is possible to obtain a crosslinkable elastomeric composition adapted to favour producing crosslinkable rubber products with both good wet traction/wet grip index in the range of 170-180 and low rolling resistance index in the range of 90-98 for superior performance of said crosslinkable rubber products only when said cross linkable elastomeric composition comprises a silica-filled ENR elastomer as masterbatch preferably as a ready compounded masterbatch obtained from latex stage preparation comprising antioxidant, oil emulsion, silica dispersion and ENR latex, and wherein said silica filled-epoxide natural rubber (ENR) elastomer as a ready compounded masterbatch preferably comprises 100 parts by weight of epoxidised natural rubber with 25% mole of epoxidation and 20 to 60 parts by weight of silica.

In a preferred aspect of the present invention, it is provided said elastomeric composition comprising a mix of 40 to 70 parts by weight of silica based on 100 parts by weight of ENR component with 25% mole of epoxidation that is prepared involving latex stage including 2 to 3 parts by weight of naphthenic oil and 2 to 3 parts of N-(1,3-dimethylbutyl)-N'-phenyl-p-phenylendiamine, suitable for use as ready compounded silica-filled ENR masterbatch which when mixed with other chemical additive is capable of providing solid tyre outer layer.

In another embodiment, a process for the preparation of said silica-filled ENR masterbatch is provided comprising of (i) obtaining the silica-filled ENR masterbatch involving a latex stage preparation which comprises antioxidant, oil emulsion, silica dispersion and ENR latex in a form adapted to favour producing crosslinkable rubber products with both good wet traction/wet grip index in the range of 170-180 and low rolling resistance index in the range of 90-98 for superior performance of said crosslinkable rubber products.

In yet another embodiment a process for the preparation of said crosslinkable elastomeric composition is provided comprising of (i) providing silica-filled ENR masterbatch involving a latex stage preparation which comprises antioxidant, oil emulsion, silica dispersion and ENR latex; followed by (ii) involving the silica-filled ENR masterbatch of step (i) as a ready compounded masterbatch suitable for further dry rubber compounding processes via conventional dry rubber processing steps. There is no limitation for the choice of silica for the present invention. Silica, such as fumed or pyrogenic silica with precipitated or hydrated amorphous silica, is known and is commercially available or known as silicon dioxide ($SiO_2$) and contain different structures, particle size and surface area. They are preferably used on tyre products such as Ultrasil® VN3 or Zeosil® 1165MP. There is no limitation for the choice of vulcanization accelerator used in the present invention. Examples thereof include guanidines, sulfonamides, thiazoles, thiurams and the likes.

In the elastomeric composition of the present invention for solid tyre tread, carbon black is preferably mixed for coloring, reinforcement and abrasion resistance improvement. There is no limitation for the type of carbon black. However, it is used in tyre products with a specific area of nitrogen adsorption between 30 to 200 ml/100 g and an adsorption amount of compressed dibutyl phthalate (DBP) is 30 to 150 ml/100 g. Examples of carbon black are Super Abrasion Furnace (SAF), Intermediate SAF (ISAF), High Abrasion Furnace (HAF) and Easy Processing Channel (EPC).

The amount of carbon black used is preferably 5 to 15 parts by weight with a balance between reinforcement and rolling resistance. The elastomeric composition for solid tyre outer layer of the present invention obtained from can be applied to fabricate solid tyre by conventional manufacturing method.

As the solid tyre rotates, it experiences repeated cycle of deformation and recovery using deformable material—rubber. Tangent delta (tan δ) is expressed by the ratio of the measurement of energy lost as heat (loss modulus—G") versus the energy stored (storage modulus—G'). This ratio represents the mechanical loss angle and is expressed as G"/G'.

Good wet traction or wet grip is predicted by a high value for tan δ at 0° C. Low rolling resistance is predicted by low tan δ value at 60° C. and higher temperature. Good (high) wet traction and low rolling resistance usually require compromise on the part of the rubber compounder. Prior to the present invention, it was a challenge to obtain both these properties in the same tyre tread composition.

Examples 1-6

Preparation of the Elastomeric Compositions Using Silica-Filled ENR Masterbatch

The present invention is further explained in details based on the example concretely, but not limited thereto. "Parts" in the examples means "parts by weight" unless otherwise specified.

The elastomeric compositions for solid tyre using silica-ENR masterbatch are given in Table 1.

The mixing was carried out at two different stages. At the first stage, all the ingredients were mixed with the exception of sulphur, the TBBS and the DPG in a Banbury internal mixer (1.6 L) for about 5 minutes. The elastomeric composition was dumped at a temperature of 150° C. At the second stage mixing, the remaining ingredients of sulphur, the TBBS and the DPG were mixed on a two-roll mill.

Example 1 is control elastomeric composition. Example 2 is comparative elastomeric composition. Examples 3 to 6 are elastomeric composition compounded via the conventional dry rubber processing method and using silica-filled ENR masterbatch.

TABLE 1

| | EXAMPLES | | | | | |
|---|---|---|---|---|---|---|
| | 1* | 2# | 3 | 4 | 5 | 6 |
| | 1<sup>ST</sup> STAGE | | | | | |
| SBR[1] | 100 | | | | | |
| SMR 20[2] | | 100 | | | | |
| Masterbatch[3] | | | 100 | | | |

TABLE 1-continued

| | EXAMPLES | | | | | |
|---|---|---|---|---|---|---|
| | 1* | 2# | 3 | 4 | 5 | 6 |
| Masterbatch[4] | | | 100 | | | |
| Masterbatch[5] | | | | 100 | | |
| Masterbatch[6] | | | | | 100 | |
| Calcium Stearate | 0 | 0 | 2 | 2 | 2 | 2 |
| Zinc Oxide | 3 | 3 | 3 | 3 | 3 | 3 |
| Stearic Acid | 2 | 2 | 2 | 2 | 2 | 2 |
| Silica[7] | 40 | 40 | 40 | 50 | 60 | 70 |
| Carbon Black[8] | 15 | 15 | 15 | 15 | 15 | 15 |
| Process Oil[9] | 5 | 5 | 4 | 4 | 4 | 4 |
| 6PPD[10] | 2 | 2 | 2 | 2 | 2 | 2 |
| TMQ[11] | 2 | 2 | 0 | 0 | 0 | 0 |
| 2$^{ND}$ STAGE | | | | | | |
| Sulphur | 1.8 | 1.8 | 1.8 | 1.8 | 1.8 | 1.8 |
| TBBS[12] | 1.5 | 1.5 | 1.5 | 1.5 | 1.5 | 1.5 |
| DPG[13] | 0.5 | 0.5 | 0.5 | 0.5 | 0.5 | 0.5 |

*Control elastomeric composition
Comparative elastomeric composition
[1]SBR: Styrene Butadiene Rubber (Nipol ® 1502 - Zeon);
[2]SMR 20: Standard Malaysian Rubber 20 (Technical Specified Polyisoprene - Malaysian Rubber Board);
[3]Masterbatch for ENR 25 with 40 parts of silica, 2 parts of Nytex 840 and 2 parts of TMQ (as described in 11) prepared at Malaysian Rubber Board (MRB);
[4]Masterbatch for ENR 25 with 50 parts of silica, 2 parts of Nytex 840 and 2 parts of TMQ (as described in 11) prepared at Malaysian Rubber Board (MRB);
[5]Masterbatch for ENR 25 with 60 parts of silica, 2 parts of Nytex 840 and 2 parts of TMQ (as described in 11) prepared at Malaysian Rubber Board (MRB);
[6]Masterbatch for ENR 25 with 70 parts of silica, 2 parts of Nytex 840 and 2 parts of TMQ (as described in 11) prepared at Malaysian Rubber Board (MRB);
[7]Silica: VN 3 GR (Ultrasil ® - Evonik)
[8]Carbon Black: N234 (Vulcan ® 7H - Cabot);
[9]Process Oil: 840 (Nytex ® - Nynas)
[10]6PPD (anti-ageing agent): N-(1,3-dimethylbutyl)-N'-phenyl-p-phenylendiamine (Santoflex ® - Flexsys);
[11]TMQ (anti-degradant agent): 2,2,4-Trimethyl-1,2-dihydroquinoline (Flectol ® - Flexsys);
[12]TBBS (accelerator): N-tert-butyl-2-benzothiazoles-sulphenamide (Santocure ® - Flexsys);
[13]DPG (accelerator): N,N'-Diphenylguanidine (Perkacit ® - Flexsys)

Example 7

Properties of Elastomeric Compositions Described in Examples 1-6 Above

The following properties were measured as depicted in examples 1-6 of the elastomeric compositions crosslinked at 150° C. for 5 minutes.

Wet Traction and Rolling Resistance Performance

Tan δ was measured under conditions of temperature of 0° C. and 60° C. and an initial strain of 10%, a dynamic strain of ±0.1% and a frequency of 10 Hz by employing a Rheometric Scientific Dynamic Mechanical Thermal Analyser (DMTA) IV. The results were expressed as index values determined by the following equation when the tan δ of Example 1 was regarded as 100. The larger index means the performance.

(Wet traction performance index)=(Tan δ of Example 1 at 0° C.)/(Tan δ of each composition at 0° C.)×100

(Rolling resistance performance index)=(Tan δ of each composition at 60° C.)/(Tan δ of Example 1 at 60° C.)×100

Abrasion Resistance Performance

Hampden Abrasion instrument was used to measure according to DIN standard 53516. The amount of abrasion under predetermined condition of a temperature of 20° C. The results were shown as indexes using the value of Example 1 as 100. The larger the index value, the more excellent the abrasion resistance.

(Abrasion resistance index)=(Abrasion resistance of each composition)/(Abrasion resistance of Example 1)×100

Tensile mechanical properties at 23° C. according to ISO standard 37.

Hardness in International Rubber Hardness Degree (IRHD) degree at 23° C. according to ISO standard 48.

Crescent tear at 23° C. according to standard ISO 34.

The results obtained are given in Table 2.

TABLE 2

| | EXAMPLES | | | | | |
|---|---|---|---|---|---|---|
| | 1* | 2# | 3 | 4 | 5 | 6 |
| International Rubber Hardness Degree (IRHD) Hardness | 66 | 72 | 52 | 51 | 51 | 61 |
| Tensile Strength (MPa) | 17.1 | 25.5 | 22.2 | 21.2 | 20.7 | 18.5 |
| Elongation at Break (%) | 573 | 619 | 539 | 491 | 426 | 402 |
| M100 (MPa) | 1.66 | 1.94 | 1.85 | 1.73 | 1.67 | 1.58 |
| M300 (MPa) | 5.1 | 6.86 | 7.71 | 7.75 | 7.65 | 7.35 |
| M500 (MPa) | 13.1 | 18.1 | 17.4 | 18.2 | 17.2 | 15.1 |
| Crescent Tear (N/mm) | 37 | 132 | 86.4 | 67.6 | 74.4 | 36.0 |
| DIN Abrasion Index | 100 | 94 | 75 | 69 | 64 | 65 |
| Wet Traction Index | 100 | 58 | 174 | 180 | 171 | 125 |
| Rolling Resistance Index | 100 | 104 | 92 | 94 | 96 | 71 |

*Control elastomeric composition
Comparative elastomeric composition

The results given in Table 2 show that the elastomeric composition according to the present invention (Examples 3 and 4) has moderate hardness value, high tensile strength and good elongation at break.

In examples 3, 4 and 5, the crosslinked manufactured product obtained from said elastomeric composition shows significant improvement in wet traction with slight reduction on rolling resistance. Many other factors play a major role for fuel economy that is related to rolling resistance of a tyre. These include vehicle weight, vehicle aerodynamic design and vehicle conditions such as alignment of vehicle's tandem and steer axles. Others factor include tyre design, inflation pressure, road surface and operating temperature.

Comparative example 3 generally indicates better performance for wet traction on tyre handling. Good tensile properties and improvement on tear strength that were exhibited in example 3 indicate better puncture resistance.

Generally, the time require to add, incorporate and disperse silica into the rubber will be omitted during compounding of solid tyre when silica-filled ENR 25 masterbatch is used. This results in higher productivity and lower production cost.

It is thus made possible, by way of the present advancement, to provide a crosslinkable elastomeric composition comprising silica-filled ENR masterbatch as a ready compounded masterbatch obtained by latex stage preparation which comprises antioxidant, oil emulsion, silica dispersion and ENR latex that is adapted to favour to produce cross-linkable rubber products with good wet traction/wet grip index in the range of 170-180 and low rolling resistance index in the range of 90-98 for superior performance. Advantageously, the said silica filled-epoxide natural rubber (ENR) elastomer comprises 100 parts by weight of epoxidised natural rubber with 25% mole of epoxidation and 20 to 60 parts by weight of silica.

Additionally, the elastomeric compositions in accordance with the present invention also provides for moderate hardness value, high tensile strength and good elongation at break wherein such good tensile properties and improvement on tear strength is also indicative of better puncture resistance.

The invention claimed is:

1. A silica-filled epoxide natural rubber (ENR) masterbatch as a ready compounded masterbatch obtained from latex stage preparation comprising antioxidant, oil emulsion, silica dispersion and ENR latex to produce cross linkable rubber products with wet traction/wet grip index in the range of 170-180 and low rolling resistance index in the range of 90-98.

2. A silica-filled ENR masterbatch as claimed in claim 1 wherein said silica filled-epoxide natural rubber (ENR) elastomer as a ready compounded masterbatch comprises a range of 80 to 120 parts by weight of epoxidised natural rubber with a range of 5 to 70% mole of epoxidation and 5 to 80 parts by weight of silica.

3. A silica-filled ENR masterbatch as claimed in claim 2 wherein said silica filled-epoxide natural rubber (ENR) elastomer as a ready compounded masterbatch comprises 100 parts by weight of epoxidised natural rubber with 25% mole of epoxidation and 5 to 80 parts by weight of silica.

4. A cross linkable elastomeric composition comprising (i) a silica-filled ENR masterbatch as a ready compounded masterbatch obtained from latex stage preparation comprising antioxidant, oil emulsion, silica dispersion and ENR latex with or without (ii) conventional additives;

wherein the cross-linkable elastomeric composition comprises:
 a. 80 to 120 parts by weight of epoxidised natural rubber with 5 to 75% mole of epoxidation;
 b. 20 to 80 parts by weight of silica;
 c. 5 to 80 parts by weight of carbon black;
 d. 5 to 10 parts by weight of process oil;
 e. 1 to 3 parts by weight of N-(1,3-dimethylbutyl)-N'-phenyl-p-phenylendiamine;
 f. 1 to 3 parts by weight of 2,2,4-trimethyl-1,2-dihydroquinoline; and
 g. 1.5 to 2.5 parts by weight of vulcanisation accelerator.

5. A cross linkable elastomeric composition as claimed in claim 4 wherein said silica filled-epoxide natural rubber (ENR) elastomer as a ready compounded masterbatch comprises 100 parts by weight of epoxidised natural rubber with 25% mole of epoxidation and 20 to 60 parts by weight of silica.

6. A cross linkable elastomeric composition as claimed in claim 4 wherein the carbon black has a nitrogen specific surface area of 30 to 200 ml/100 g and dibutyl phthalate (DBP) of 30 to 150 ml/100 g.

7. A cross linkable elastomeric composition as claimed in claim 4 wherein the process oil is selected from naphthenic, aromatic or paraffinic oil.

8. A cross linkable elastomeric composition as claimed in claim 4 wherein said vulcanization accelerator is selected from guanidines, sulfonamides, thiazoles, and thiurams.

9. A cross linkable elastomeric composition claimed in claim 4 wherein the silica is silicon.

10. A cross linkable elastomeric composition as claimed in claim 4 wherein said carbon black in the range of 5 to 15 parts by weight, providing a desired balance between reinforcement and rolling resistance.

11. A cross linkable elastomeric composition as claimed in claim 4 wherein the cross linkable elastomeric composition involves ingredients from sustainable raw materials.

12. A cross linkable elastomeric composition as claimed in claim 4 wherein the silica comprises fumed silica, pyrogenic silica or precipitated hydrated amorphous silica.

13. Cross-linked rubber product comprising an elastomeric composition comprised of:
 a. a silica-filled ENR masterbatch as a ready compounded masterbatch obtained from latex stage preparation comprising antioxidant, oil emulsion, silica dispersion and ENR latex; and with or without
 b. conventional additives;
 wherein the cross-linked rubber product has a wet traction/wet grip index in the range of 170-180 and low rolling resistance index in the range of 90-98.

14. Cross-linked rubber product as claimed in claim 13 wherein said silica filled-epoxide natural rubber (ENR) elastomer as a ready compounded masterbatch comprises a range of 80 to 120 parts by weight of epoxidised natural rubber with a range of 5 to 70% mole of epoxidation and 5 to 80 parts by weight of silica.

15. Cross-linked rubber product as claimed in claim 14 wherein said silica filled-epoxide natural rubber (ENR) elastomer as a ready compounded masterbatch comprises 100 parts by weight of epoxidised natural rubber with 25% mole of epoxidation and 5 to 80 parts by weight of silica.

16. Cross-linked rubber product as claimed in claim 14 wherein the cross-linked rubber product is incorporated into a solid tires.

17. Cross-linked rubber product as claimed claim 13 wherein the cross-linked rubber product is included in at least an outer layer of a solid tire.

* * * * *